UNITED STATES PATENT OFFICE.

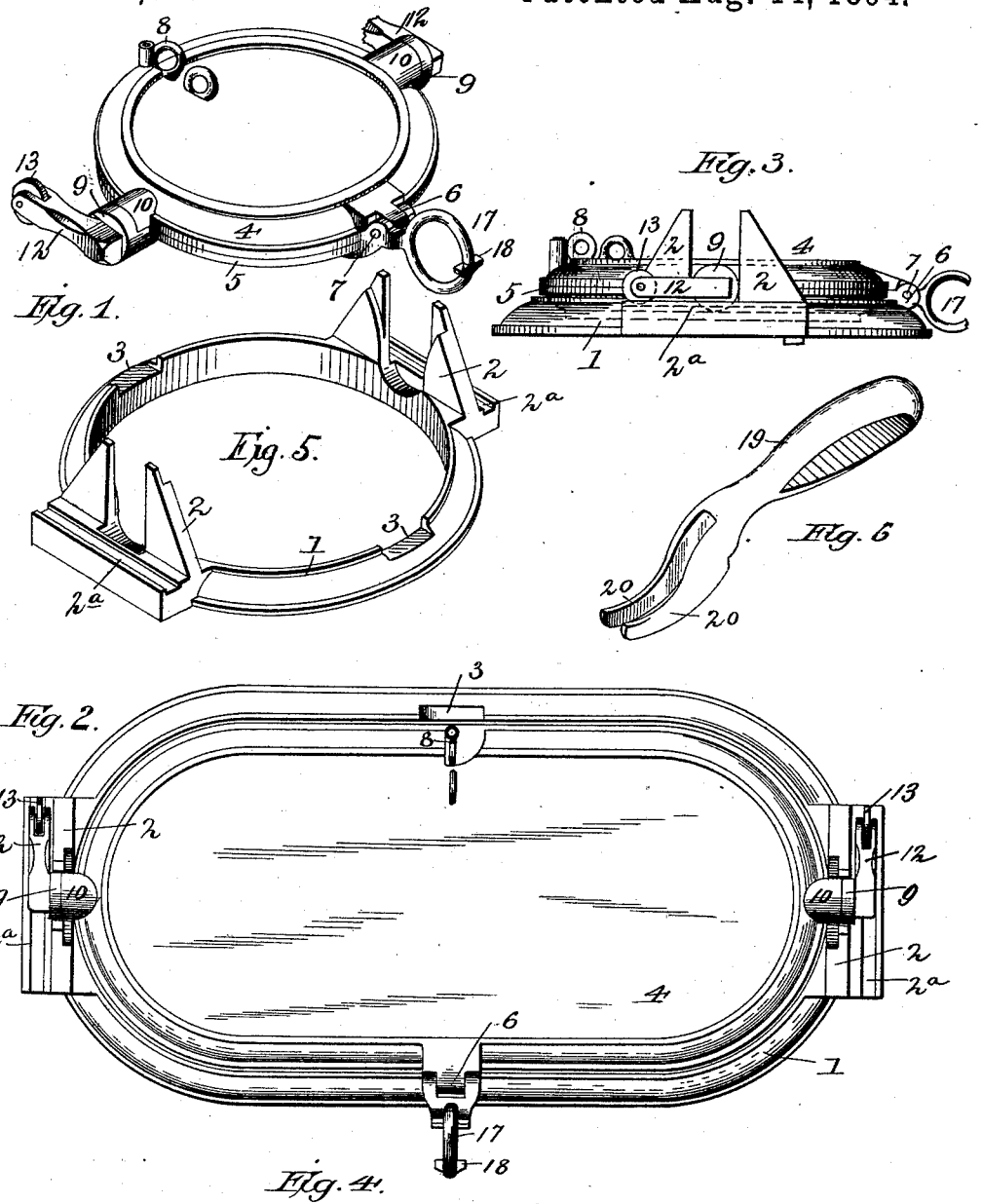

JACOB B. SKEYEN, OF HILLSBOROUGH, NORTH DAKOTA.

COOKING UTENSIL.

SPECIFICATION forming part of Letters Patent No. 524,616, dated August 14, 1894.

Application filed March 16, 1894. Serial No. 503,383. (No model.)

*To all whom it may concern:*

Be it known that I, JACOB B. SKEYEN, a citizen of the United States, and a resident of Hillsborough, in the county of Trail and State of North Dakota, have invented certain new and useful Improvements in Cocking Utensils; and I do hereby declare that the following is a full, clear, and exact description of the invention, which will enable others skilled in the art to which it appertains to make and use the same, reference being had to the accompanying drawings, which form a part of this specification.

My invention relates to improvements in cooking utensils for frying meat, cooking waffles, and other similar or analogous articles of food, and is of that description or character which comprises two sections hinged together forming a closed receptacle for containing the articles to be cooked, so that it may be turned or inverted for heating both sides, without any liability of spilling the contents.

The object of the invention is to provide an improved cooking utensil of the above character which shall possess superior advantages with respect to efficiency in operation.

The invention consists in the novel construction and combination of parts, hereinafter fully described and claimed.

In the accompanying drawings: Figure 1 is a perspective view of a cooking utensil, constructed according to my invention, designed to be used with a single hole of a stove. Fig. 2 is a plan view showing a slightly modified form, so as to adapt the device to two stove holes. Fig. 3 is a side elevation of the device shown in Fig. 1. Fig. 4 is a central longitudinal sectional view. Fig. 5 is a perspective view of the ring or rim. Fig. 6 is a similar view of the handle.

In the said drawings, the reference numeral 1 designates a circular or oblong ring or rim of any suitable metal, formed with upwardly extending lugs 2, and tracks 2ª diametrically opposite each other, forming ways or bearings for the trunnions of the cooker, hereinafter described. Upon its upper face the ring or rim is formed with two recesses 3, opposite to each other. This rim when made circular, as in Fig. 1, is adapted to fit over a single pot hole of an ordinary cooking stove. When made oblong, as shown in Fig. 2, it is adapted to fit over the space formed by removing the two stove lids and the intervening plate.

The cooker proper is made of two metal sections, 4 and 5, conforming in shape to the rim 1, and of a size corresponding with, or slightly less than the inner diameter of the said rim. These sections are formed with intermeshing lugs 6, connected together by a pin 7, forming a hinge. One of these sections 5 is provided with a pivoted catch 8 which is adapted to engage with the other section and lock them together. These sections 5 are formed diametrically opposite each other with trunnions 9, which fit in the bearings or ways formed by the lugs 2. The other section 4 is formed with semi-circular recessed lugs 10, which fit over the trunnions 9, when the cooker is closed. Each of the said trunnions is formed or provided with a lateral arm 12, in which is journaled a roller 13, which is adapted to travel on the track 2ª, while the cooker is being turned or inverted. The inner face of one of said sections is provided with an annular beveled flange 15, near its edge which fits in a corresponding groove 16 in the other section, when said sections are closed, thus making a tight joint. Secured to or formed with the outer face of one or both of said sections is a ring 17, formed with two lugs or studs 18 with which is adapted to engage a handle 19, having one end bifurcated forming arms 20, by which said lugs are grasped.

When the device is to be used for frying meat, the sections are made in the form of pans, while when used for cooking waffles and other similar articles, they are provided with the usual ribs and projections on the inner faces. These sections are removable from the rim and are interchangeable, so that one can be readily substituted for another.

The operation will be readily understood: When used for cooking meat the latter is placed in one of the sections and the other section closed and locked. There will thus be formed a closed receptacle which retains the flavor and steam of the meat. When one side of the meat has been properly cooked, the bifurcated handle is engaged with the lugs on the ring 17, and the receptacle or cooker raised and turned or inverted, the rollers 13 traveling on the track 2ª.

Having thus described my invention, what I claim is—

1. In a cooking utensil, the combination with the sections hinged together and provided with trunnions, having radial arms provided with rollers, of the rim having ways or bearings in which said trunnions work, and the track on which said rollers travel, substantially as and for the purpose specified.

2. In a cooking utensil of the character described, the combination with the sections hinged together, the catch for locking said sections, the ring having lugs formed with or secured to one of said sections, the trunnions and recesses on the inner faces of said sections, and the radial arms provided with rollers, of the rim having diametrically opposite lugs forming ways for said trunnions and the tracks on which said rollers travel, substantially as and for the purpose specified.

In testimony that I claim the foregoing as my own I have hereunto affixed my signature in presence of two witnesses.

JACOB B. SKEYEN.

Witnesses:
B. E. INGWALDSON,
A. LINDELIE.